US010217385B2

(12) United States Patent
Weiner et al.

(10) Patent No.: US 10,217,385 B2
(45) Date of Patent: Feb. 26, 2019

(54) DUAL-FACED LABELLING SYSTEMS

(71) Applicant: Nastar Inc., Middleton, WI (US)

(72) Inventors: Gary H. Weiner, Middleton, WI (US);
David R. James, Middleton, WI (US);
John Short, Middleton, WI (US)

(73) Assignee: NASTAR INC., Middleton, WI (US)

( * ) Notice: Subject to any disclaimer, the term of this patent is extended or adjusted under 35 U.S.C. 154(b) by 119 days.

(21) Appl. No.: 15/474,692

(22) Filed: Mar. 30, 2017

(65) Prior Publication Data
US 2017/0206811 A1 Jul. 20, 2017

Related U.S. Application Data

(62) Division of application No. 15/090,081, filed on Apr. 4, 2016, now Pat. No. 9,613,547.
(Continued)

(51) Int. Cl.
*G09F 3/00* (2006.01)
*B32B 7/00* (2006.01)
(Continued)

(52) U.S. Cl.
CPC .............. *G09F 3/10* (2013.01); *B32B 3/02* (2013.01); *B32B 7/06* (2013.01); *B32B 7/12* (2013.01);
(Continued)

(58) Field of Classification Search
CPC ...... G09F 2003/0241; G09F 3/10; C09J 7/02; C09J 2001/128; C09J 2001/606;
(Continued)

(56) References Cited

U.S. PATENT DOCUMENTS 4,460,634 A 7/1984 Hasegawa
5,618,062 A 4/1997 Mertens et al.
(Continued)

FOREIGN PATENT DOCUMENTS

GB 2 224 691 5/1990

OTHER PUBLICATIONS

Non-Final Office Action on U.S. Appl. No. 15/090,081 dated Sep. 9, 2016.
(Continued)

*Primary Examiner* — Linda L Gray
(74) *Attorney, Agent, or Firm* — Foley & Lardner LLP

(57) ABSTRACT

A method includes applying a release formulation to a first substrate, wherein the release formulation is applied to a first portion of the first substrate leaving a second portion of the first substrate without the release formulation; applying the release formulation to a second substrate, wherein the release formulation is applied to a second portion of the second substrate leaving a first portion of the second substrate without the release formulation; applying an adhesive to the first substrate, wherein the adhesive covers at least a part of the first portion of the first substrate and at least a part of the second portion of the first substrate; and laminating the first substrate to the second substrate to form a laminated article; wherein the laminated article is configured to transfer the adhesive on the first portion of the first substrate to the first portion of the second substrate upon separation of the first substrate from the second substrate.

19 Claims, 13 Drawing Sheets

Related U.S. Application Data

(60) Provisional application No. 62/142,820, filed on Apr. 3, 2015.

(51) Int. Cl.

| | | |
|---|---|---|
| *B32B 37/00* | (2006.01) | |
| *C09J 7/00* | (2018.01) | |
| *G09F 3/10* | (2006.01) | |
| *B32B 7/06* | (2019.01) | |
| *B32B 7/12* | (2006.01) | |
| *B32B 7/14* | (2006.01) | |
| *B32B 27/08* | (2006.01) | |
| *B32B 27/10* | (2006.01) | |
| *B32B 29/00* | (2006.01) | |
| *B32B 3/02* | (2006.01) | |
| *B32B 37/12* | (2006.01) | |
| *B32B 37/26* | (2006.01) | |
| *G09F 3/02* | (2006.01) | |
| *C09J 7/38* | (2018.01) | |
| *C09J 7/29* | (2018.01) | |
| *B42D 5/00* | (2006.01) | |

(52) U.S. Cl.
CPC .............. *B32B 7/14* (2013.01); *B32B 27/08* (2013.01); *B32B 27/10* (2013.01); *B32B 29/00* (2013.01); *B32B 29/002* (2013.01); *B32B 37/12* (2013.01); *B32B 37/1292* (2013.01); *B32B 37/26* (2013.01); *C09J 7/29* (2018.01); *C09J 7/38* (2018.01); *G09F 3/02* (2013.01); *B32B 2037/268* (2013.01); *B32B 2250/02* (2013.01); *B32B 2255/10* (2013.01); *B32B 2255/12* (2013.01); *B32B 2255/26* (2013.01); *B32B 2307/4023* (2013.01); *B32B 2307/748* (2013.01); *B32B 2307/75* (2013.01); *B32B 2317/12* (2013.01); *B32B 2398/00* (2013.01); *B32B 2519/00* (2013.01); *B42D 5/003* (2013.01); *C09J 2201/28* (2013.01); *C09J 2203/334* (2013.01); *G09F 2003/0226* (2013.01); *G09F 2003/0241* (2013.01); *G09F 2003/0255* (2013.01); *Y10T 428/24802* (2015.01)

(58) Field of Classification Search
CPC .............. C09J 2203/10; C09J 2203/334; C09J 2205/10; C09J 2205/005; Y10T 428/24802; Y10T 156/1195; Y10T 156/1707; B42D 5/003
See application file for complete search history.

(56) References Cited

U.S. PATENT DOCUMENTS

| | | |
|---|---|---|
| 6,171,008 B1 * | 1/2001 | Ochsner .................. B42F 5/00 281/22 |
| 6,620,275 B1 | 9/2003 | Avila et al. |
| 6,717,008 B2 | 4/2004 | Jaehne et al. |
| 8,011,126 B2 | 9/2011 | Nunez et al. |
| 8,163,365 B2 | 4/2012 | Weiner et al. |
| 8,261,477 B1 | 9/2012 | Wilkinson et al. |
| 8,836,990 B1 | 9/2014 | Dale et al. |
| 8,885,204 B1 | 11/2014 | Dale et al. |
| 8,910,864 B2 | 12/2014 | Falls et al. |
| 9,199,427 B2 | 12/2015 | Weidauer et al. |
| 2014/0367956 A1 | 12/2014 | Wilkinson et al. |
| 2015/0043016 A1 | 2/2015 | Randall et al. |

OTHER PUBLICATIONS

Notice of Allowance on U.S. Appl. No. 15/090,081 dated Feb. 15, 2017.

* cited by examiner

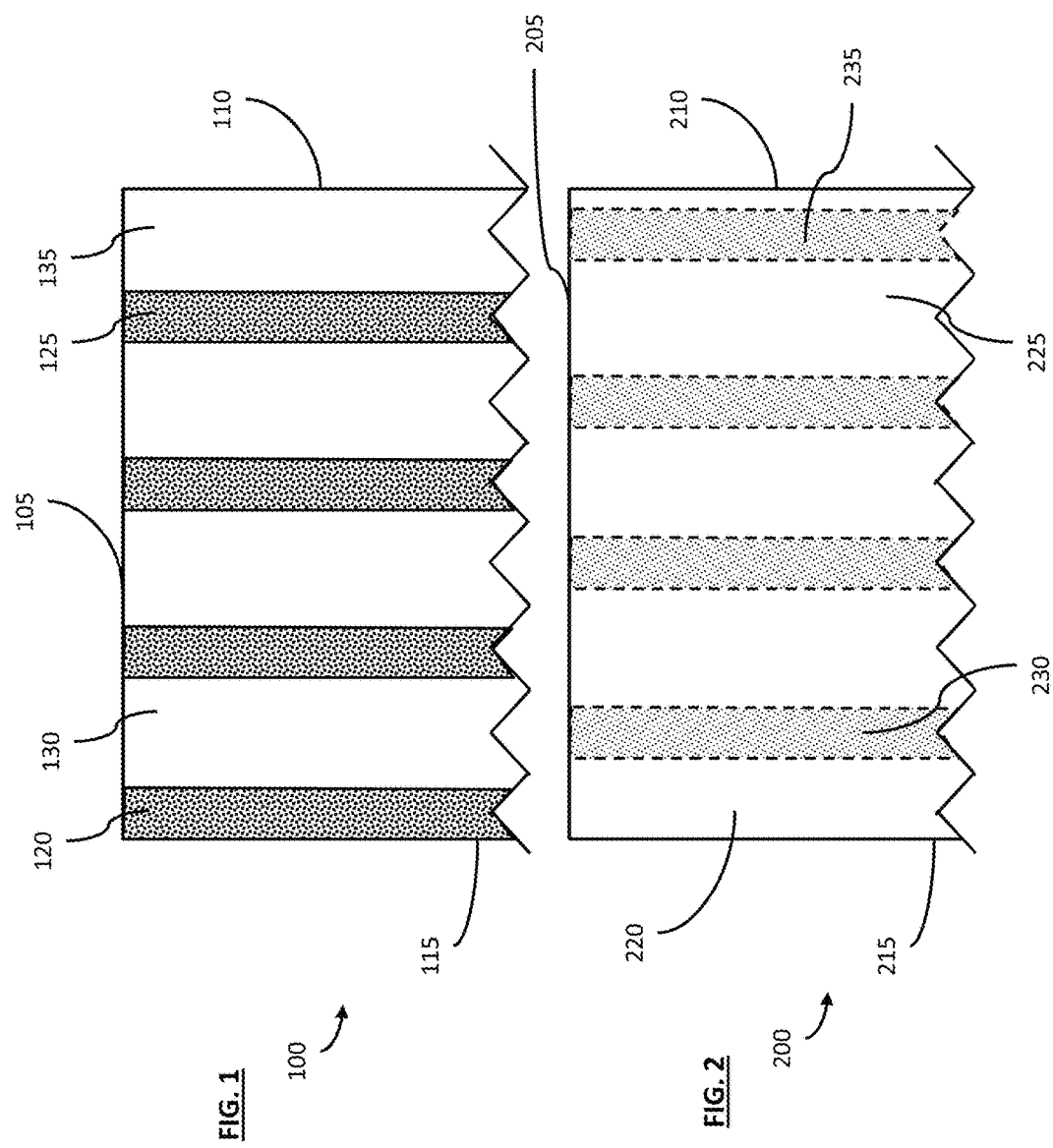

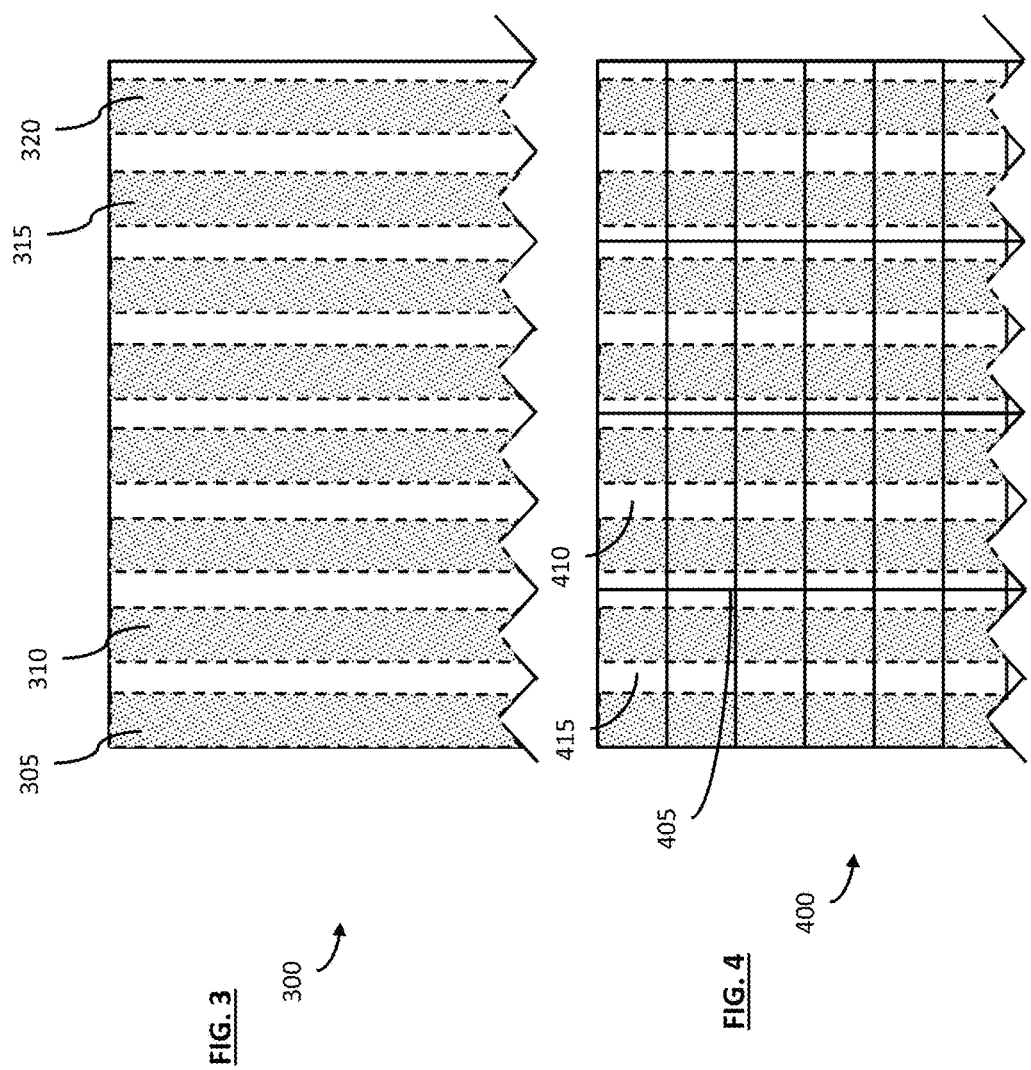

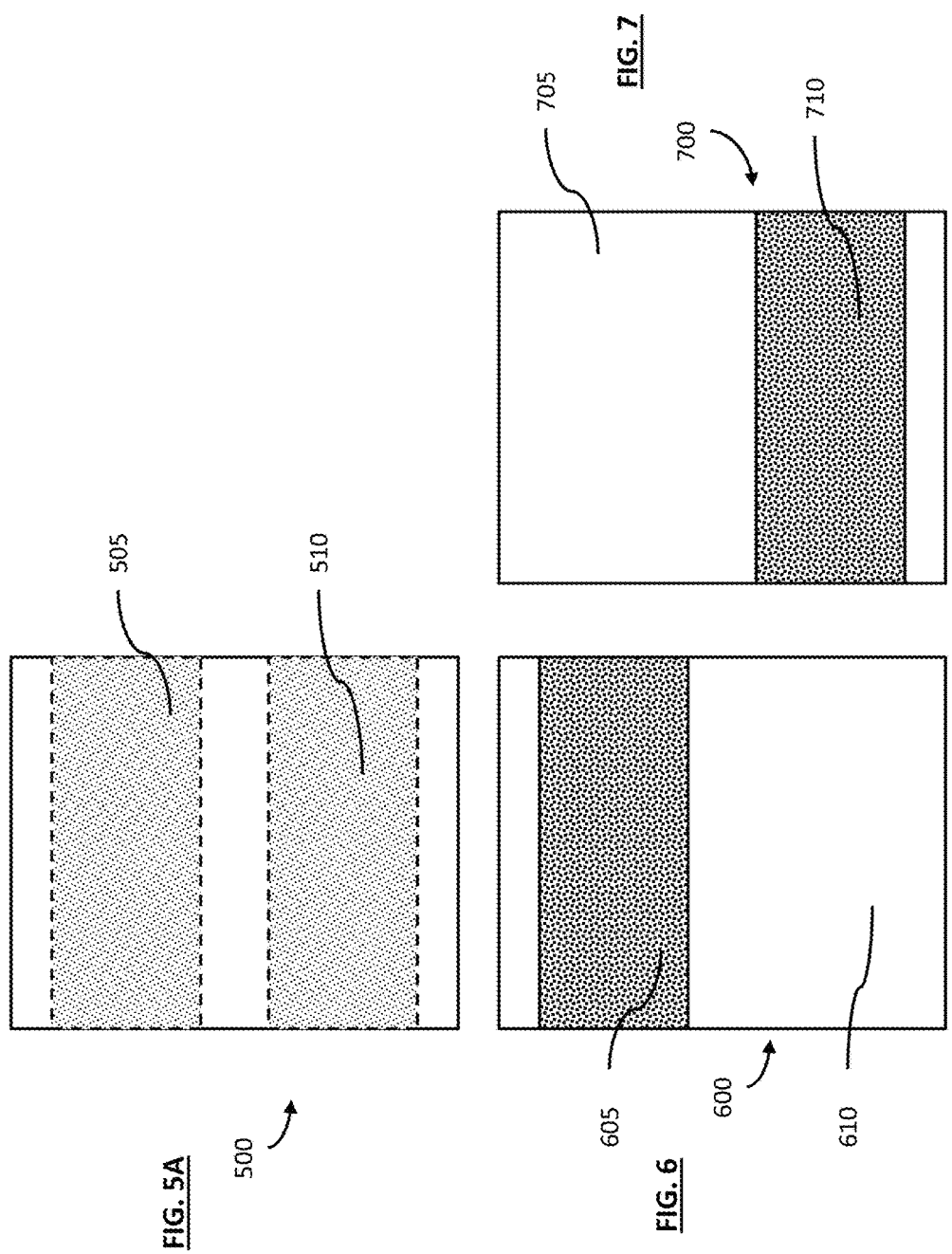

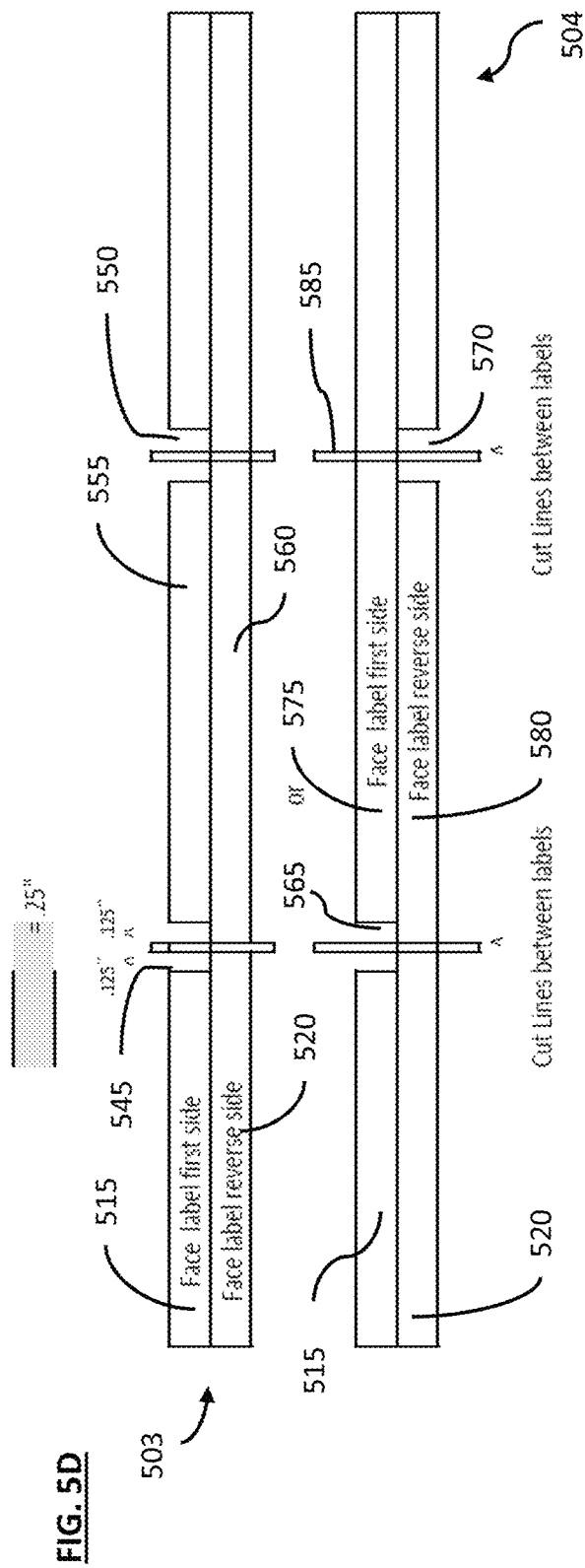

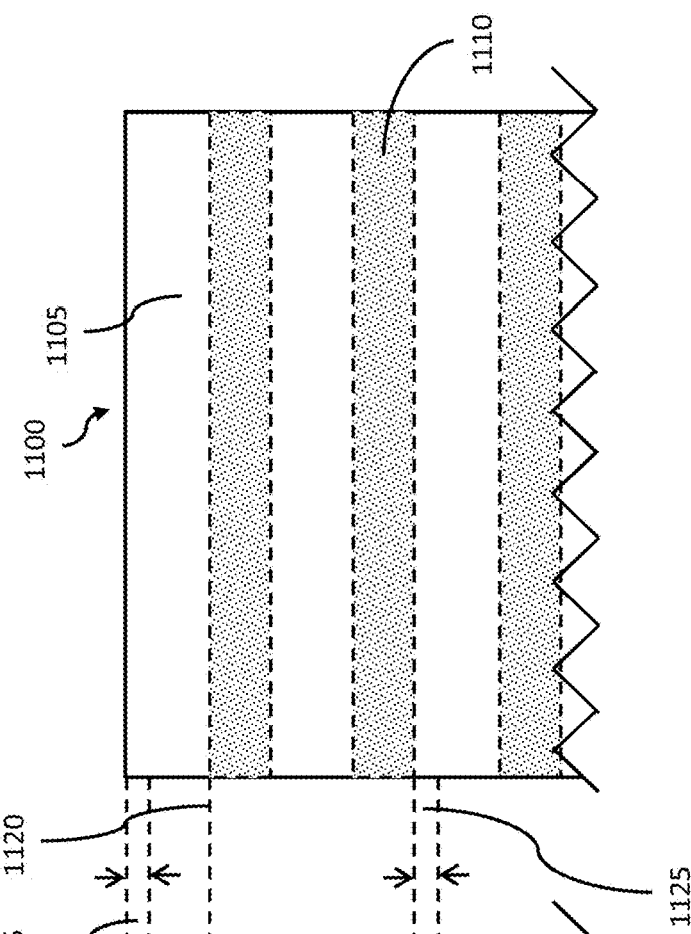
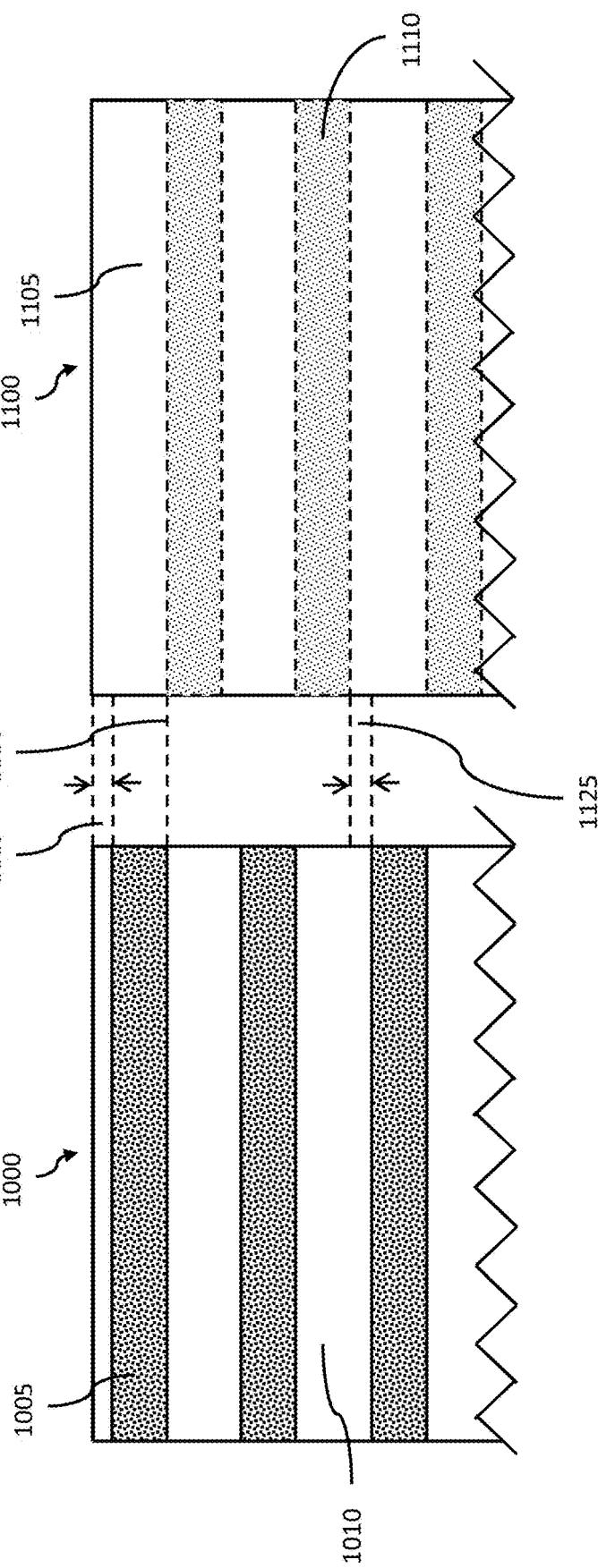

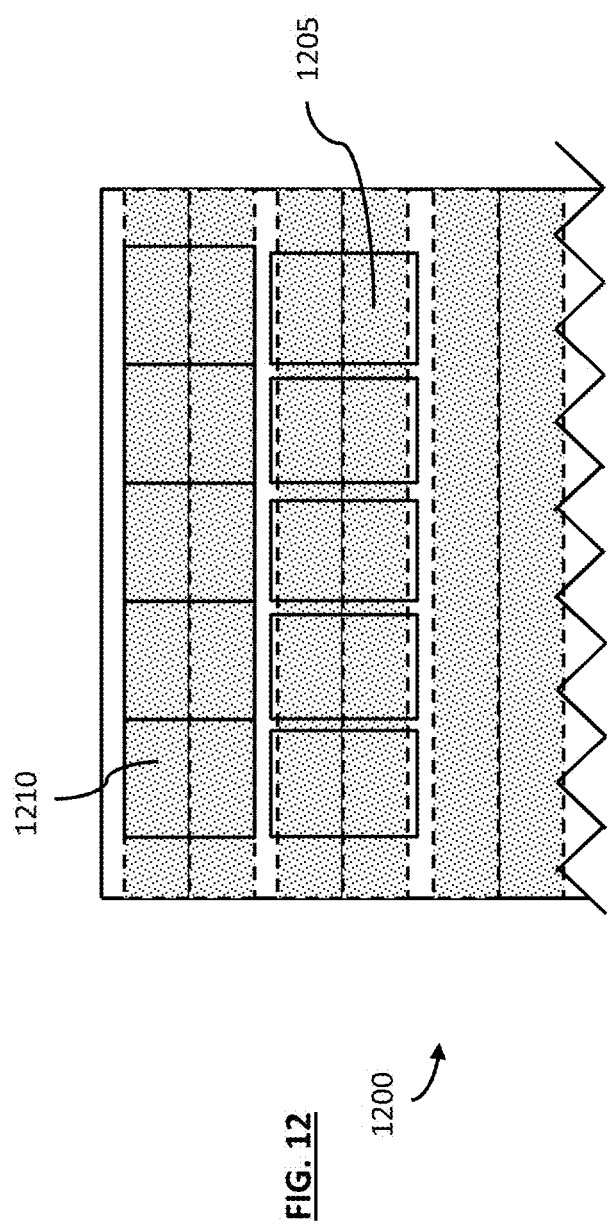

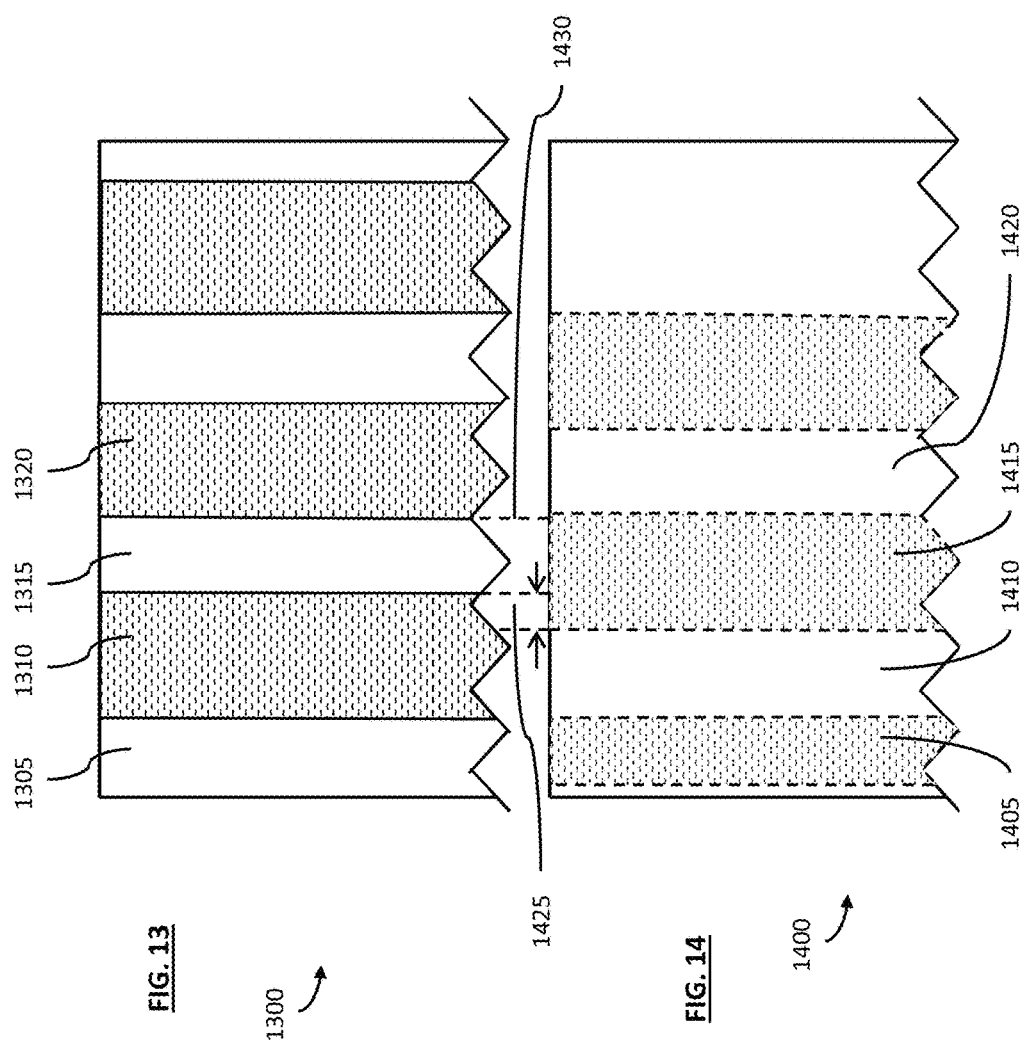

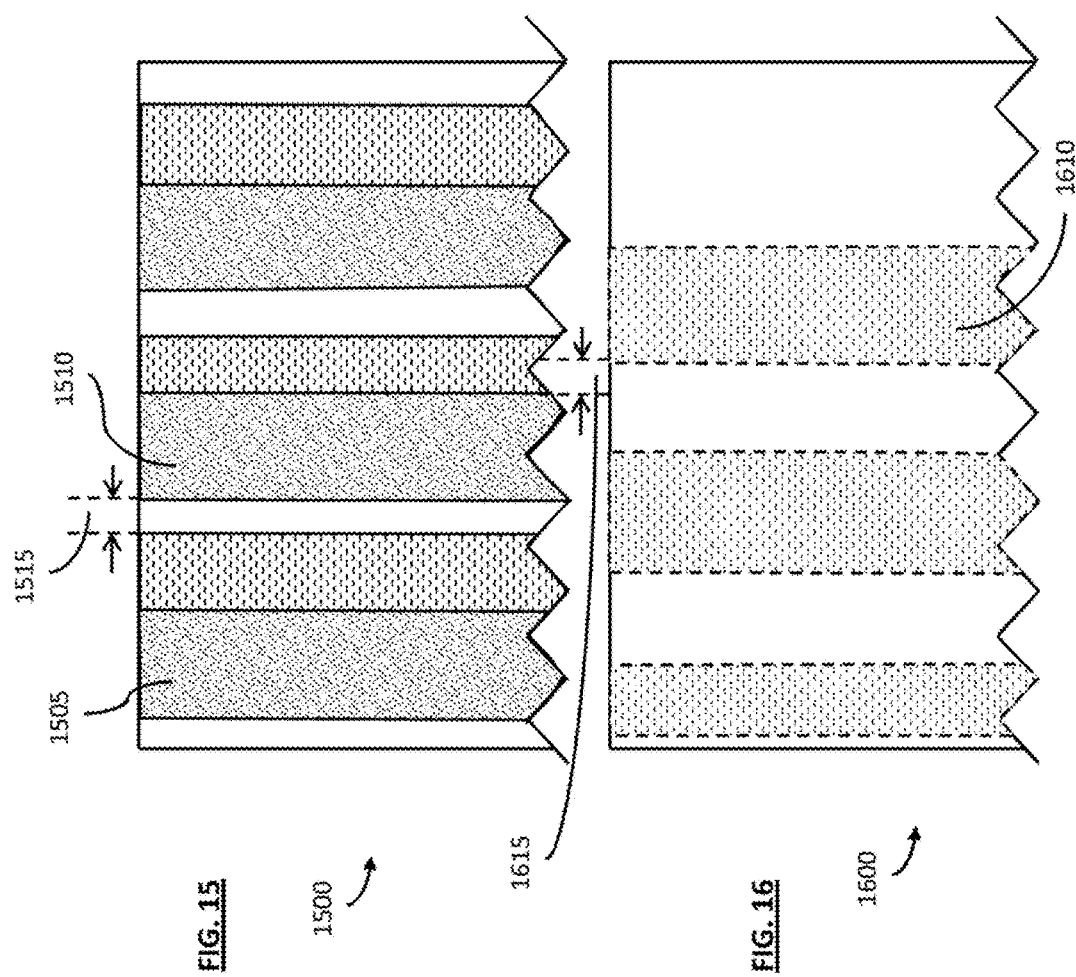

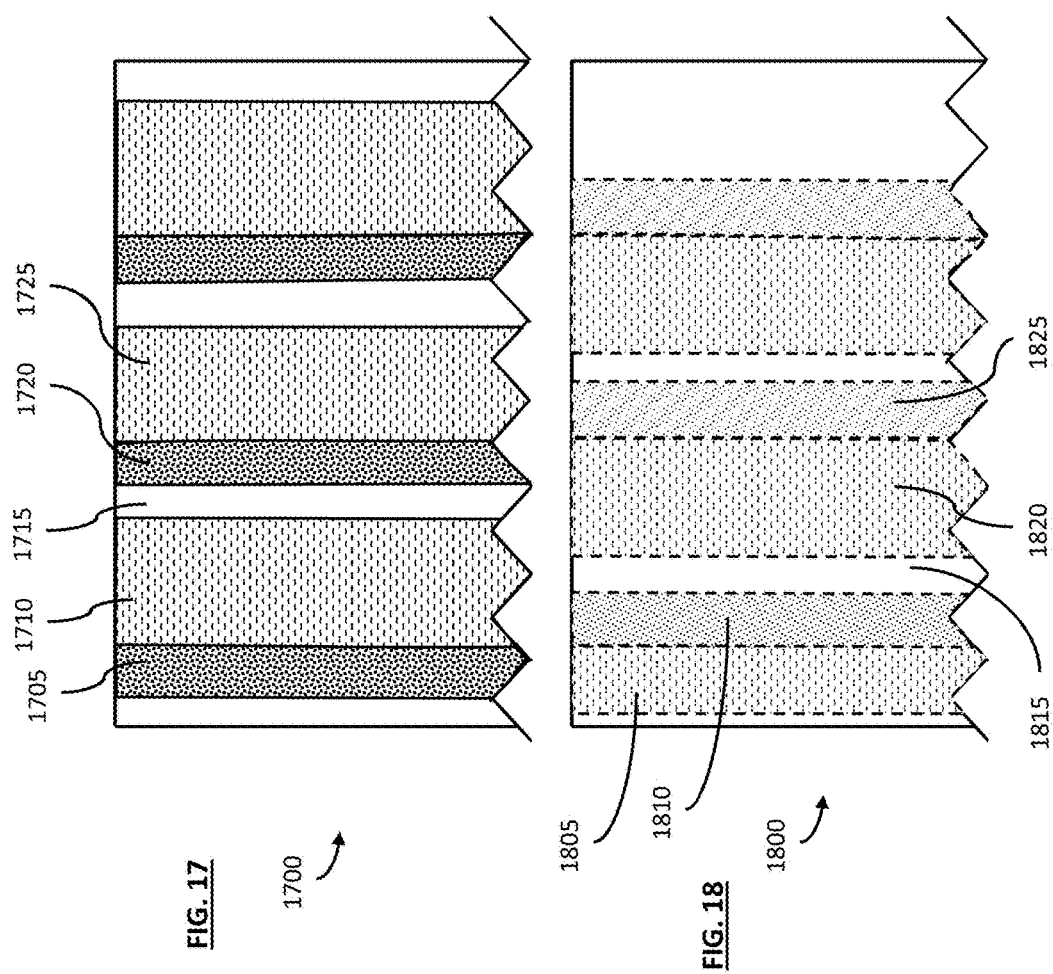

DUAL-FACED LABELLING SYSTEMS

CROSS-REFERENCE TO RELATED PATENT APPLICATION

This application is a divisional of U.S. application Ser. No. 15/090,081, filed Apr. 4, 2016, which claims benefit of U.S. Provisional Patent Application No. 62/142,820, filed on Apr. 3, 2015, the entireties of which are incorporated herein by reference.

BACKGROUND

Printed advertisements are widely used to sell products and services. A printed advertisement may be sent to a customer or potential customer through the mail. A printed advertisement may also be present in a store, so as to be viewed by patrons in the store. Such printed advertisements may be placed in an advertisement holder that makes the advertisement visible to the consumers. Such an advertisement holder may be made of clear plastic to allow visibility of the advertisement held therein. In another embodiment, advertisements may be affixed to different objects inside or outside a store to be made visible to potential or current customers.

One type of advertisement that affixes to an object uses an adhesive on the back of the advertisement. For example, repositionable pressure-sensitive adhesives may be used to allow a printed advertisement to adhere to a surface while allowing reapplication of the object to a variety of different surfaces over an extended period of time without damaging or otherwise marring the surface. Other items than advertisements may also similarly utilize an adhesive, including masking tapes, removable labels or office notes, protective films, and medical tapes.

SUMMARY

An illustrative apparatus includes a first substrate and a second substrate. The first substrate includes a first adhesive-receiving face. The first adhesive-receiving face includes a first adhesive-coated region and a first release region. The first substrate also includes a first print receiving face opposite the first adhesive-receiving face. The second substrate includes a second adhesive-receiving face. The second adhesive-receiving face includes a second adhesive-coated region and a second release region. The second substrate also includes a second print receiving face opposite the second adhesive-receiving face. The first adhesive-coated region is releasably adhered the second release region and the second adhesive-coated region is releasably adhered to the first release region.

An illustrative apparatus includes a substrate. The substrate includes an adhesive-receiving face. The adhesive-receiving face includes a plurality of adhesive-coated regions and a plurality of release regions. The substrate also includes a print receiving face opposite the adhesive-receiving face. The substrate also includes a top edge, a bottom edge, a leading edge, and a trailing edge. The plurality of adhesive-coated regions and the plurality of release regions extend from the top edge of the substrate to the bottom edge of the substrate. The plurality of adhesive coated regions and the plurality of release regions alternate between the leading edge and the trailing edge.

An illustrative method includes applying a release formulation to a first substrate. The release formulation is applied to a first portion of the first substrate. The method further includes applying the release formulation to a second substrate. The release formulation is applied to a second portion of the second substrate. The method further includes applying an adhesive to the first substrate. The adhesive covers at least a part of the first portion with the release formulation and at least a part of the first substrate with no release formulation. The method further includes laminating the first substrate to the second substrate. The adhesive on the first substrate releasably adheres the first substrate to the second substrate.

An illustrative apparatus includes a first substrate and a second substrate. The first substrate includes a first adhesive-receiving face. The first adhesive-receiving face includes a first adhesive-coated region and a first release region. The first substrate also includes a first print receiving face opposite the first adhesive-receiving face having ink or digital imaging printed thereon. The second substrate includes a second adhesive-receiving face. The second adhesive-receiving face includes a second adhesive-coated region and a second release region. The second substrate also includes a second print receiving face opposite the second adhesive-receiving face having ink or digital imaging printed thereon. The first adhesive-coated region is releasably adhered the second release region and the second adhesive-coated region is releasably adhered to the first release region.

An illustrative apparatus includes a substrate. The substrate includes an adhesive-receiving face including one or more of adhesive-coated regions and one or more release regions. The substrate further includes a print receiving face opposite the adhesive-receiving face and four edges. The one or more adhesive-coated regions and the one or more release regions extend from a first edge of the substrate to a second edge of the substrate. The one or more adhesive-coated regions and the one or more release regions alternate between a third edge and a fourth edge.

BRIEF DESCRIPTION OF THE DRAWINGS

Illustrative embodiments will hereafter be described with reference to the accompanying drawings.

FIG. 1 illustrates an adhesive-receiving face of a first substrate in accordance with an illustrative embodiment.

FIG. 2 illustrates a print receiving face of a second substrate in accordance with an illustrative embodiment.

FIG. 3 illustrates a print receiving face of first and second substrates adhered together in accordance with an illustrative embodiment.

FIG. 4 illustrates a print receiving face of first and second substrates adhered together and cut or perforated into labels in accordance with an illustrative embodiment.

FIG. 5A illustrates a print receiving face of dual sided label in accordance with an illustrative embodiment.

FIG. 5D illustrates a cross section of a dual sided labels with same side cuts in accordance with an illustrative embodiment.

FIG. 5E illustrates a cross section of a dual sided labels with opposite side cuts in accordance with an illustrative embodiment.

FIG. 6 illustrates an adhesive-receiving face of a single label from a first substrate in accordance with an illustrative embodiment.

FIG. 7 illustrates an adhesive-receiving face of a single label from a second substrate in accordance with an illustrative embodiment.

FIG. 10 illustrates an adhesive-receiving face of a first substrate with an adhesive pattern across the web in accordance with an illustrative embodiment.

FIG. 11 illustrates a print receiving face of a second substrate with an adhesive pattern across the web in accordance with an illustrative embodiment.

FIG. 12 illustrates a print receiving face of first and second substrates with adhesive patterns across the web adhered together and cut or perforated into labels in accordance with an illustrative embodiment.

FIG. 13 illustrates an adhesive-receiving face of a first substrate with a release formulation applied in accordance with an illustrative embodiment.

FIG. 14 illustrates a print receiving face of a second substrate with a release formulation applied in accordance with an illustrative embodiment.

FIG. 15 illustrates an adhesive-receiving face of a first substrate with adhesive applied in accordance with an illustrative embodiment.

FIG. 16 illustrates a print receiving face of a second substrate with a release formulation applied in accordance with an illustrative embodiment.

FIG. 17 illustrates an adhesive-receiving face of a first substrate after being separated from a second substrate in accordance with an illustrative embodiment.

FIG. 18 illustrates a print receiving face of a second substrate after being separated from a first substrate in accordance with an illustrative embodiment.

DETAILED DESCRIPTION

Figure 5B:
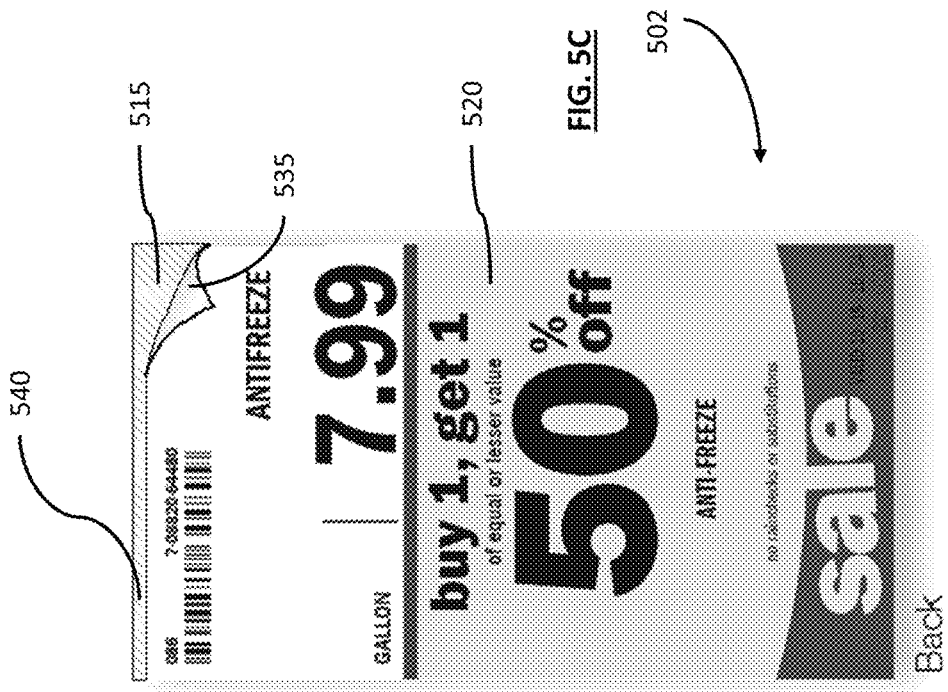
FIG. 5B illustrates a print receiving face of dual sided label being peeled back in accordance with an illustrative embodiment.

Retailers desire to effectively communicate, promote and sell in the store environment. They frequently promote items with shelf marking tags as the ever growing competition of the consumer retail dollar increases. A shelf tag is one way of drawing eyes to products at retailers. They promote special pricing, product features, dietary warnings, amongst others. Shelf tags can be costly to purchase and distribute, are not environmentally responsible, and are cumbersome to affix and easily remove. Fifty percent of the product is often disposed of and is not part of a shelf tag when it is affixed to a shelf: the liners on the back of shelf tags.

The dual-faced labeling system is a more environmentally responsible shelf talker, which has no liner waste for employees to deal with, increases throughput at the in-store print level, and allows for twice as many tags per square inch of finished product.

Disclosed herein are various systems, methods, apparatuses, and articles of manufacture for dual-faced labelling systems. For example, a dual-faced labelling system may be used as a shelf-talker label or a shelf edge label. Such labels may be placed near or over a price at a store, such as a grocery, drug, or hardware store. In other embodiments, the labels may be placed on any object or product. The label may broadcast a lower price of a product or offer some other sort of benefit. The label may also be merely informative or decorative. The label may generally adhere to or otherwise attach to a shelf or other product or indicator. A part of a label may not attach to the shelf or object: a part of the label may hang off as a flag to dangle attracting attention for the product or the sale. Part of the label may not attach to the object or shelf for other reasons. For example, if the label is attached to a product, only a portion of the label may attach to the product, and part of the label may not have adhesive. In this way, labels may be easier to handle, may attach to various objects without regard for their size, and may be easier to detach from the object if desired. In other words, the labels disclosed herein may have a fixation portion and a non-fixation portion. Other types of dual-faced labels are also disclosed herein. In an illustrative embodiment, two substrates are adhered together using releasable adhesive. Each substrate serves as a backing for the other substrate. When the substrates are peeled apart, each substrate yields one or more label. Each label from either substrate has adhesive on the back of it, allowing each label to be affixed to another object. In an illustrative embodiment, each label has an adhesive-coated region and a release region. A label with an adhesive-coated region can stick to an object while the release region flags (does not adhere to) off of the object.

The traditional labels used in shelf marking and disclosed in this application can utilize a filmic, paper, or latex based face material and silicone coated paper release liner. A filmic face stock coupled with a silicone coated release liner may not be repulpable and is therefore landfilled as waste. Two face substrates mated together (the dual faced labeling system disclosed herein) eliminates the separate silicone coated release liner. A repulpable adhesive allows the labels, after use, to be placed in the waste paper stream rather than traditional landfill waste.

In a finished label format using a single label with a liner, 30-50% of a silicone coated paper release liner is not used for any purpose other than to cover the adhesive on the label so as not to expose adhesive to the consumer when the label is affixed to the end use product. Using a pattern coated adhesive format can eliminate the use of silicone coated paper release liners as the exposed area when the labels are affixed to the end use product is ungummed (i.e., has no adhesive). In other words, patterning adhesive to exist only where a shelf talker label is affixed to a shelf eliminates the consideration of covering other portions of the label with a liner, as there is no longer adhesive in the locations of the back of the label that are not affixed to the shelf.

Labels that utilize a liner often utilize a filmic face material and silicone coated paper release liner. Dissimilar materials such as these films and papers can result in a moisture imbalance with a likely result of end use label curl when labels are applied in moist, refrigerated, and/or frozen environments. The dual-faced labeling system with no liner as disclosed herein eliminates this problem.

In addition, a sheet of two print surfaces adhered together yields significantly more (e.g., twice as many) total labels than a similarly sized sheet of one substrate with a silicone coated paper liner backing that does not yield labels and is discarded. This allows for more labels per sheet, box, or carton, and subsequently lowers freight costs to the end user, as twice as much product and weight is needed to be shipped when using the filmic or paper face material and silicone coated release paper liner construction.

In an illustrative embodiment, a release agent or release formulation may be used on the back of the substrates or labels. The release agent or formulation can prevent adhesive from permanently adhering to a label or substrate. Accordingly, release agent or formulation may be patterned and/or placed on first and second substrates such that adhesive will permanently adhere to parts of the first and second substrates that are not covered by the release agent or formulation. Similarly, where the first and second substrates are covered by the release agent or formulation, adhesive may releasably (temporarily) adhere to the substrate, but may release from a substrate where another substrate does not have the release agent or formulation as disclosed herein.

Varying adhesives and adhesive patterns may be used in different illustrative embodiments disclosed herein. For example, a dot patterned, pressure sensitive adhesive as disclosed in U.S. Pat. No. 8,163,365 may be used. U.S. Pat. No. 8,163,365 is incorporated herein by reference in its entirety. Other adhesives and/or patterns of adhesive may be utilized in varying embodiments. For example, water-based adhesives, gum-based adhesives, water-based pressure-sensitive adhesives, and fugitive type adhesives may all be used.

In an illustrative embodiment, a dual-faced label may include a first substrate and a second substrate. The substrates may be a type of paper or other similar sheet of material used for advertisements, printing, etc. For example, the substrates may be a paper or polymer film. The first substrate has a first adhesive-receiving face with a first adhesive-coated region and a first release region. In other words, the back of the first substrate is covered, in part, with adhesive and covered, in part, with a release formulation or agent. In various illustrative embodiments, release agents or formulations used may be a non-silicone release formulation or a traditional silicone release formulation. Similarly, the second substrate also has a second adhesive-receiving face with a second adhesive-coated region and a second release region in juxtaposition. That is, the back of the second substrate is also covered, in part, with adhesive and covered, in part, with a release formulation or agent.

The first substrate also has a first print receiving face opposite the first adhesive-receiving face. Similarly, the second substrate has a second print receiving face opposite the second adhesive-receiving face. In other words, each of the substrates has a side with the adhesive and release formulation, and an opposite side called the print receiving face.

When the first and second substrates are adhered together, the first adhesive-coated region of the first substrate is releasably adhered to the second release region of the second substrate. Similarly, the second adhesive-coated region of the second substrate is releasably adhered to the first release region of the first substrate. In other words, the adhesive can adhere to a release region on each substrate, but the adhesive is releasable. That is, the adhesive will not stay adhered to a release region when the substrates are separated.

In one illustrative embodiment, the adhesive-coated regions of the first and second substrates are a uniform, discontinuous, pattern of adhesive areas either in a machine direction or across the web of the substrates. In various embodiments, the pattern of adhesive areas may be various shapes, for example a dash shape or an elongated dot shape. In another embodiment, the adhesive may be a uniform, continuous strip of pattern stripes in a machine direction or across the web. In other words, adhesive may be applied to the substrates in a pattern arranged horizontally or vertically across a sheet. In another alternative embodiment, an adhesive pattern may have a different arrangement.

When the adhesive is applied as a pattern, the first and second substrates may have a plurality of adhesive-coated regions and a plurality of release regions. In this way, many labels may be produced from the substrates. In such an embodiment, the plurality of adhesive-coated regions and release regions on each substrate can alternate in a pattern. Accordingly, the adhesive-coated regions on the first substrate can be configured to line up with and adhere to the plurality of release regions on the second substrate. Similarly, the adhesive-coated regions on the second substrate can be configured to line up with and adhere to the plurality of release regions on the first substrate. When the two substrates are adhered together, the patterns may be aligned such that the adhesive-coated regions of the first substrate do not contact the adhesive-coated regions of the second substrate.

When the adhesive is applied as a pattern, the first and second substrates may have a plurality of adhesive-coated regions and a plurality of release regions. In this way, many labels may be produced from the substrates. The regions may extend with adhesive to the edge of the label edge or may have an ungummed area also known as a finger lift edge to facilitate easy separation of the first substrate side from the second substrate side. Alternatively, the top and bottom edges of the finished labels may be offset as in FIGS. 5B and 5C, discussed below, to facilitate easy separation from first substrate side and second substrate side.

The adhesive and release agent areas may be formed and shaped in varying ways as disclosed herein. In one illustrative embodiment, the adhesive regions may extend from a top edge of a substrate to a bottom edge of the substrate. Such adhesive areas would form a sort of vertical bars of adhesive with release agent areas in between each adhesive area. Accordingly, the release agent areas may also extend from a top edge of the substrate to the bottom edge of the substrate. In a different embodiment, the release agent and adhesive areas may instead alternate and extend from a first edge to a second edge of a substrate, or may form any other pattern or orientation. In one illustrative embodiment, the release agent areas and adhesive areas of a substrate extend continuously from one edge to another (that is, without a break from edge to edge). In other embodiments, the adhesive and release agent areas may not extend continuously from one edge to another.

In the illustrative embodiments disclosed herein, adhesive, anchor coatings, and/or release formulations/agents may be applied to the substrates in varying ways. As just one illustrative example, a gravure coater may be used to apply adhesive. In an illustrative embodiment, an adhesive may not gain peel adhesion when attached or applied to a surface. In other alternative embodiments, an adhesive used may gain more peel adhesion. In an illustrative embodiment, a gravure coater includes an adhesive coating pan, a gravure roll, a backup roll, adhesive, and a web of material. Other coaters or configurations may be used to apply adhesive, anchor coatings, and/or release formulations/agents. In a gravure coater and adhesive embodiment, the adhesive coating pan stores the adhesive. The gravure roll transfers the adhesive onto the web of material. The backup roll pinches the web of material to the gravure roll for application of the adhesive. A pan fed gravure coater may be used as well as other configurations. For example, in other embodiments, an enclosed doctor blade feed or a slotted die feed may be used. The adhesive allows repositioning of the paper stock without damaging the surface of the substrate to which the paper stock is applied. In an illustrative embodiment, the adhesive is a water based adhesive. Water based acrylic and rubber based adhesives with full coverage have a peel adhesion curve that increases as a function of time and temperature after 30 minutes and for a period of up to 7 days. Using the adhesive areas, however, a relatively flat peel adhesion curve results after 30 minutes providing consistent adhesion and predictable removability of the paper stock from a substrate to which the paper stock is applied. The web of material may be a substrate such as paper stock.

The web of material can be a long paper material that is set in the gravure coater in a wound roll. The web of material is pulled from the wound roll, passed between the gravure roll and the backup roll to adhere the adhesive, and then wound onto a second roll. In an alternative embodiment, the web of material may be in the form of stacked sheets.

The shape, size, and distribution of the adhesive areas is created using a mold layer overlaid on the gravure roll. The mold layer (or engraved area) includes ridges and recesses that define the shape, size, and distribution of the adhesive areas that are formed on the web of material. Accordingly, the mold layer can be configured to apply adhesive (or anchor coat or release agent/formulation) to a web of material or substrate in patterns, shapes, and/or regions as disclosed by the various embodiments disclosed herein. The adhesive fills the recesses of the mold layer on the periphery of the gravure roll. Passage of the web between the gravure roll and the backup roll transfers the filled recesses of adhesive to an outer surface of the web of material.

The gravure roll is rotated by a motor either with a web direction (direct gravure); against the web direction (reverse gravure); or offset to an additional roll (offset gravure). A portion of the gravure roll receives the adhesive from the adhesive coating pan. A leading edge of the adhesive coating pan contacts the periphery of the gravure roll scraping off extra adhesive deposited on the ridges of the mold layer leaving adhesive in the recesses. The backup roll is rotatably biased toward the gravure roll. The backup roll is rotated by movement of the web and the rotation of the gravure roll in the direction shown. Other adhesive coating technologies may be used to achieve the patterned adhesive pattern including, but not limited to, screen, slot die, reverse roll, and the like.

The adhesive areas can be applied to the paper stock or substrate. Additionally, the process of forming either the first substrate or the second substrate can be performed using a variety of processes. For example, the adhesive areas can be applied to the paper stock or substrate opposite a previously applied ink layer and laminated to a second substrate using the coating. Pressure sensitive adhesive used in various embodiments may be a water based emulsion adhesive, which is one of many types of adhesive technology that may be used for this type of label. Others types may be solvent based adhesives, hot melt adhesives, ultra-violet (UV), light emitting diode (LED), or electron beam cured adhesives.

The print receiving faces of the first and second substrates may have a first and second indicia, respectively, thereon. In other words, varying words, images, numbers, etc. may be printed or imaged onto the print receiving faces of the substrates. Adhesive on the adhesive-receiving faces of the substrates may be a pressure sensitive adhesive. Pressure sensitive adhesive may be removable or permanent. In one embodiment, the permanent adhesive may be a form of permanent adhesive such as a freezer adhesive. That is, a substrate with pressure sensitive adhesive adhered to it may be releasably adhered to other objects, and can be removed without leaving behind adhesive on the other objects (the adhesive stays permanently adhered to the substrate). The pressure sensitive adhesive may be repulpable. Additionally, the substrates used may also be repulpable. Accordingly, if the substrate and adhesive are repulpable, the whole label is repulpable. In an alternative embodiment, the adhesive may be configured to be removed from the substrate as well.

The substrates that are releasably adhered to each other may be diecut, perforated, etc. into individual labels. The substrates can be cut at the same time. After being cut, individual labels of the first substrate can be separated from corresponding individual labels of the second substrate. A cut or perforation may exist in a substrate at an adhesive edge where an adhesive-coated region and a release region meet. In various embodiments, cuts or perforations in the substrates to yield individual label pairs may coincide with the edge of an adhesive-coated region and/or release region, may be wholly within an adhesive-coated region and/or release region, or may be outside of an adhesive-coated region and/or release region (e.g., at a non-adhesive coated region). Further, the cuts or perforations to make labels can be in the shape of a rectangle, polygon, circle, or any other shape. That is, the labels yielded by the substrates may be in any shape as cut or perforated into the substrates.

Accordingly, single substrates exist before or after being adhered to another substrate. A single substrate according to an illustrative embodiment has an adhesive-receiving face with a plurality of adhesive-coated regions and a plurality of release regions. The single substrate also has a print receiving face opposite the adhesive-receiving face, as well as a first edge, second edge, third edge edge, and fourth edge. The plurality of adhesive-coated regions and the plurality of release regions extend from the first edge of the substrate to the second edge of the substrate. The plurality of adhesive-coated regions and the plurality of release regions alternate between the third edge and the fourth edge.

Various methods can be practiced to make the various embodiments of dual-faced labels as disclosed herein. In one illustrative embodiment, an anchor coating is applied to a first substrate and a second substrate. The anchor coating may be a tie-coat, a primer formulation, or other suitable anchor coating. The anchor coating is applied to all of the first and second substrates including each face of the substrates. In an alternative embodiment, not every part of the first and second substrates has an anchor coating applied.

A release formulation is applied to the first and the second substrates. The release formulation may be applied after the anchor coating is applied to the first and the second substrates. Further, the release formulation is only applied to a portion of the first and second substrates, so that adhesive can attach to a part of each substrate where there is no release formulation. The adhesive is applied to the first substrate. In an illustrative embodiment, the adhesive is applied to the first substrate after the anchor coating is applied and after the release formulation is applied to the first substrate. The first substrate and the second substrate are then laminated together so that the adhesive on the first substrate releasably adheres the first substrate to the second substrate.

After the substrates are adhered together, the first and second substrates may be separated. When the substrates are separated, the adhesive on the portion of the first substrate with the release formulation is removed from the first substrate and stays on a portion of the second substrate that is not covered by a release formulation. Further, adhesive that was applied to a portion of the first substrate that did not have release formulation on it remains on the first substrate (and may also correspond to a portion of the second substrate that has release formulation on it). In one illustrative embodiment, when the first substrate and second substrate are laminated together, the release formulation on the first substrate is interleaved with the release formulation on the second substrate such that the part of the release formulation on each of the first substrate and the second substrate overlaps and another part of the release formulation on the first substrate and the second substrate do not overlap.

The first and second substrates may also be printed with ink or digitally imaged to have text, graphics, numbers, etc. on the substrates. The printing or imaging may occur after the substrates have been adhered to each other. Further, the printing or imaging may occur before the substrates are cut or separated from each other. In alternative embodiments, the order of these steps may differ.

The substrates may further be diecut or perforated to yield labels from the substrates. After the substrates are perforated or diecut, the substrates may be separated to yield the individual labels. Individual labels may be separated from a substrate one at a time or more than one at a time. The diecutting or perforating is done so that each individual label has a fixation portion with adhesive attached a non-fixation portion with no adhesive attached. For example, the portion with no adhesive may be a portion that has release formulation so no adhesive adhered to a given label when it was separated from an opposing substrate. The fixation portion of the label may be fixed to an object with the adhesive, and the non-fixation portion may extend from the object as a flag.

FIG. 1 illustrates an adhesive-receiving face of a first substrate 100 in accordance with an illustrative embodiment. In alternative embodiments, fewer, additional, and/or different elements may be present. FIG. 2 illustrates a print receiving face of a second substrate 200 in accordance with an illustrative embodiment. In alternative embodiments, fewer, additional, and/or different elements may be present. Substrate 100 has a first edge 105, a second edge (not pictured), a third edge 110, and a fourth edge 115. Similarly, substrate 200 has a first edge 205, a second edge (not pictured), a third edge 210, and a fourth edge 215. For other figures described herein that are oriented similarly (e.g., FIGS. 3, 4, 10-18), the substrates shown in those figures may be described herein as having similar four edges, even though reference numerals are not designated for each edge in the other figures herein.

The substrate 100 includes adhesive-coated regions, such as regions 120 and 125. The substrate 100 also includes release regions, such as regions 130 and 135. The release regions 130 and 135 may have a release formulation. Here, the release regions and the adhesive-coated regions alternate between the third edge 110 and the fourth edge 115 of the substrate 100. The release regions and the adhesive-coated regions also extend continuously from the first edge 105 to the second edge. In alternative embodiments, the regions may be configured or placed differently. For example, the regions may be discontinuous. The regions may not extend completely to any of the third edge 110, the fourth edge 115, the first edge 105, or the second edge. The regions may also not be rectangular as shown in FIG. 1, and may in alternative embodiments be different shapes.

The substrate 200 includes adhesive-coated regions, such as regions 230 and 235. The substrate 200 also includes release regions, such as regions 220 and 225. The release regions 220 and 225 may have a release formulation. In order to demonstrate how the regions of the substrate 200 correspond to the regions of the substrate 100, a print receiving face of the substrate 200 is displayed. The adhesive-coated regions are therefore shown as dashed a lighter areas because they are on the opposing adhesive-receiving face of the substrate 200. The adhesive-coated regions of the substrate 200 may not be different from the adhesive-coated regions of the substrate 100, but are shown differently in the figures because a different face of the substrate 200 is shown. FIGS. 3-5, 11, 12, 14, 16, and 18 similarly show dashed areas because the substrate view of those figures are of the print receiving face, not an adhesive-receiving face.

Similar to the substrate 100, the release regions and the adhesive-coated regions of the substrate 200 alternate between the top edge 210 and the bottom edge 215, and are shown as extending continuously from the leading edge 205 to the second edge of the substrate 200. As described above with respect to the substrate 100, the shapes, locations, etc. of the release regions and the adhesive-coated regions may vary in alternative embodiments.

The adhesive-coated regions of the substrate 100 are configured to align with the release regions of the substrate 200. The adhesive-coated regions of the substrate 200 are configured to align with the release regions of the substrate 100. In this way, the substrate 100 and the substrate 200 may be releasably adhered together. Further, when the substrate 100 and the substrate 200 are separated, the configuration of the release regions and the adhesive-coated regions generally causes the adhesive-coated regions to stay adhered to the substrates 100 and 200 as shown in FIGS. 1 and 2. As an example, the adhesive-coated region 120 of the substrate 100 is aligned with the release region 220 of the substrate 200. Similarly, the release region 135 of the substrate 100 is aligned with the adhesive-coated region 235 of the substrate 200.

FIG. 3 illustrates a print receiving face of first and second substrates adhered together in accordance with an illustrative embodiment. In alternative embodiments, fewer, additional, and/or different elements may be present. The dual-faced sheet 300 in FIG. 3 generally shows a first substrate and a second substrate adhered together according to an illustrative embodiment. For example, the substrate 100 and the substrate 200 of FIGS. 1 and 2 may be adhered together to yield the dual-faced sheet 300. Here, all adhesive-coated regions (e.g., 305, 310, 315, 320) are shown as lighter and dashed because the adhesive is between the two substrates, and FIG. 3 generally shows the print receiving face of the second (top) substrate. Additionally, each of the adhesive-coated regions (e.g., 305, 310, 315, 320) also correspond to a release region on the corresponding substrate. For example, the region 305 may correspond to the adhesive-coated region 120 of the substrate 100 and the release region 220 of the substrate 200. Similarly, the region 320 may correspond to the adhesive-coated region 235 of the substrate 200 and the release region 135 of the substrate 100.

FIG. 4 illustrates a print receiving face of first and second substrates adhered together and cut or perforated into labels in accordance with an illustrative embodiment. In alternative embodiments, fewer, additional, and/or different elements may be present. The dual-faced sheet 400 of FIG. 4 is cut or perforated into individual label sections (e.g., 410, 415). FIG. 4 also shows cut lines (e.g., 405) that demonstrate where label sections may be cut or perforated. The label section 410 has spaces between the top edge and the first row of adhesive, the first row of adhesive and the second row of adhesive, and the second row of adhesive and the bottom edge. In alternative embodiments, the label sections may be cut, perforated, configured, etc. differently. For example, the label section 415 includes adhesive at the bottom edge of the label section 415.

FIG. 5A illustrates a print receiving face of dual sided label 500 in accordance with an illustrative embodiment. In alternative embodiments, fewer, additional, and/or different elements may be present. The dual sided label 500 may be, for example, the label section 410 of FIG. 4 when it is removed from the overall dual-faced sheet 400. Such removal may be due to cutting, punching out a perforation by a user, etc. The dual sided label 500 shows a print receiving face and adhesive-coated regions 505 and 510, shown as dashed because they are in between a first and second substrate of the dual sided label 500. Each of the adhesive-coated regions 505 and 510 adhere the first and second substrate together, but as discussed below with respect to FIGS. 6 and 7, the adhesive-coated regions 505 and 510 would separate and adhere to separate substrates when the first and second substrates are separated.

FIG. 6 illustrates an adhesive-receiving face of a single label 600 from a first substrate in accordance with an illustrative embodiment. In alternative embodiments, fewer, additional, and/or different elements may be present. FIG. 7 illustrates an adhesive-receiving face of a single label 700 from a second substrate in accordance with an illustrative embodiment. In alternative embodiments, fewer, additional, and/or different elements may be present. As discussed above, FIGS. 6 and 7 demonstrate single labels 600 and 700 that may be a result of separating a first and second substrate of the dual sided label 500 in FIG. 5A. The single label 600 includes a fixation portion 605 with adhesive and a non-fixation portion 610 without adhesive. Additionally, the non-fixation portion 610 may correspond to a release portion. The single label 700 includes a fixation portion 710 with adhesive and a non-fixation portion 705 without adhesive. Additionally, the non-fixation portion 705 may correspond to a release portion.

FIG. 5B illustrates a print receiving face of dual sided label 501 being peeled back in accordance with an illustrative embodiment. The label of FIG. 5B includes a first substrate 515 and a second substrate 520. The first substrate 515 and second substrate 520 are offset to leave an offset region 530. As disclosed herein, the offset region 530 where the second substrate 520 exists may have adhesive (i.e., be part of an adhesive coated region) or may have no adhesive (i.e., part of a non-adhesive coated region or be part of a release region). The offset region 530 may exist as a result of cutting or scoring, such as described below with respect to FIGS. 5D and 5E. In an alternative embodiment, the offset region 530 may exist due to a process of laying the first substrate 515 on the second substrate 520 aligned in such a way as to create the offset region 530. The offset region 530 provides easier separation of the labels, where the offset region 530 provides a finger lift edge 525 of the first substrate 515. The finger lift edge 525 is shown partly separated during a peeling process of separating the first substrate 515 from the second substrate 520. During storage, transportation, etc. of the dual sided label 501, the finger lift edge 525 would lay flat upon the second substrate 520.

Figure 5C:
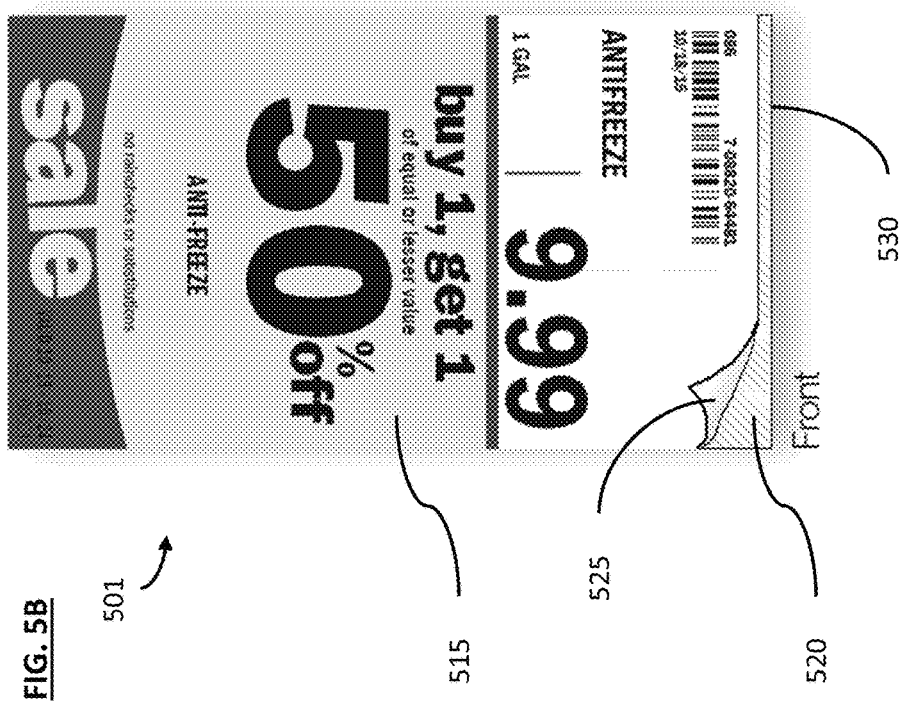
FIG. 5C illustrates a second print receiving face of dual sided label being peeled back in accordance with an illustrative embodiment.

FIG. 5C illustrates a second print receiving face of dual sided label 502 being peeled back in accordance with an illustrative embodiment. The dual sided label 502 of FIG. 5C may be the opposite side of the dual sided label 501 of FIG. 5B. It has the first substrate 515 and the second substrate 520, which are aligned or cut/scored to yield an offset region 540 and a finger lift edge 535.

FIG. 5D illustrates a cross section of a dual sided labels 503 with same side cuts in accordance with an illustrative embodiment. Cuts 545 and 550 show a way for creating the offset regions (or finger lift edges) described above with respect to FIGS. 5B and 5C. The dual sided labels 503 include the first substrate 515 and the second substrate 520. The cut 550 corresponds to other label pairs, for example a pair with a first substrate 555 and a second substrate 560, such that the dual sided labels 503 represent a sheet of multiple dual sided labels. In an alternative embodiment, a sheet may have half as many cuts as shown in FIG. 5D, such that a cut like the cut 545 occur at every other cut line between labels. FIG. 5D shows a 0.125 inch margin between cut lines between labels and an edge of the cut substrate (e.g., substrates 515, 555). Other margins are contemplated. A 0.25 inch scale is shown. Other scales and proportions than those shown in FIGS. 5D and 5E are contemplated. Additionally, the cuts 545 and 550 may be many types of cuts, such as guillotine cuts, a slit cut all the way through one substrate (here the substrates 515, 555), and/or a score partially through one substrate (here the substrates 515, 555). These cuts may also be used in the embodiment shown in FIG. 5E.

FIG. 5E illustrates a cross section of a dual sided labels 503 with opposite side cuts in accordance with an illustrative embodiment. Cuts 565 and 570 show a way for creating the offset regions (or finger lift regions) described above with respect to FIGS. 5B and 5C. The dual sided labels 504 include the first substrate 515 and the second substrate 520. The cut 565 would correspond with the offset region 530 of FIG. 5B. The cut 570 would correspond with the offset region 540 of FIG. 5C. The cut 570 corresponds to two label pairs, including one with a first substrate 575 and a second substrate 580, such that the dual sided labels 504 represent a sheet of multiple dual sided labels. Also shown is a line 585 that represents where label pairs may be cut or perforated to yield the individual label pairs such as those shown in FIGS. 5B and 5C.

Figure 5F:
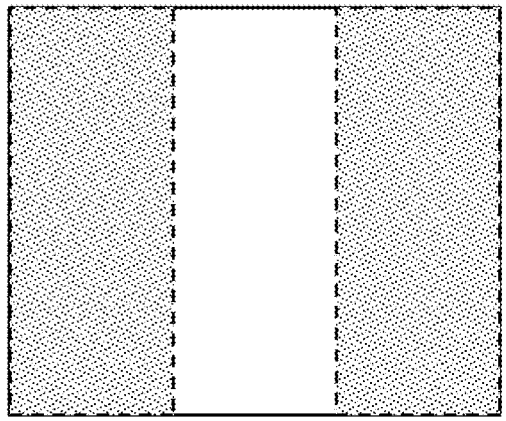
FIG. 5F illustrates a print receiving face of dual sided label in accordance with an illustrative embodiment.
Figure 5G:
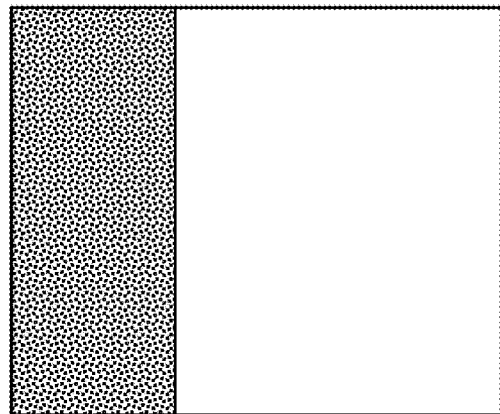
FIG. 5G illustrates an adhesive-receiving face of a single label from a first substrate in accordance with an illustrative embodiment.
Figure 5H:
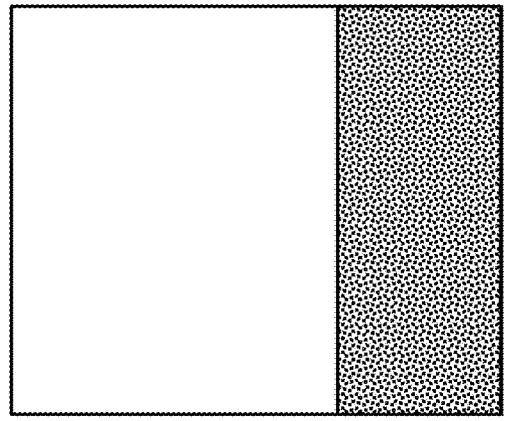
FIG. 5H illustrates an adhesive-receiving face of a single label from a second substrate in accordance with an illustrative embodiment.

FIG. 5F illustrates a print receiving face of dual sided label in accordance with an illustrative embodiment. FIG. 5G illustrates an adhesive-receiving face of a single label from a first substrate in accordance with an illustrative embodiment. FIG. 5H illustrates an adhesive-receiving face of a single label from a second substrate in accordance with an illustrative embodiment. FIGS. 5F, 5G, and 5H show alternate versions of FIGS. 5-7 where the adhesive regions (and corresponding release regions) extend to additional edges of the individual labels as disclosed herein.

Figure 8:
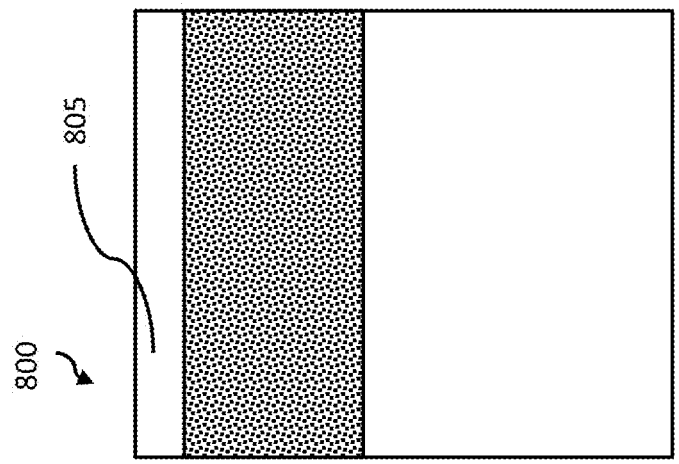
FIG. 8 illustrates an adhesive-receiving face of a single label from a first substrate in accordance with an illustrative embodiment.

FIG. 8 illustrates an adhesive-receiving face of a single label 800 from a first substrate in accordance with an illustrative embodiment. In alternative embodiments, fewer, additional, and/or different elements may be present. The single label 800 includes a non-adhesive coated region 805 that is defined by the area between an adhesive coated region and a top edge of the single label 800. Here, the adhesive coated region extends to a first side edge and a second side edge of the single label 800, but does not extend to the top edge or bottom edge of the single label 800. The non-adhesive coated region 805 may be ungummed to serve as a finger lift edge, which makes the single label 800 easier to peel apart from another label that originally serves as the backing to the single label 800. In alternative embodiments, the adhesive coated region may extend to the top edge. In other embodiments, the non-adhesive coated region may be incorporated into embodiments such as those described above with regard to FIGS. 5B-5E. In such an embodiment, the offset or cut labels may also have non-adhesive coated region, such that there is a finger lift edge on each of the back to back labels, and the cut or scored area exists to further aid in separating the labels. Such an embodiment would also prevent offset regions (e.g. offset regions 530, 540 of FIGS. 5B and 5C) from having exposed adhesive, which may be desirable when packaging or transporting to prevent label pairs from sticking together and may also prevent debris, dirt, dust, etc. from sticking to a label pair before it is separated and used.

Figure 9:
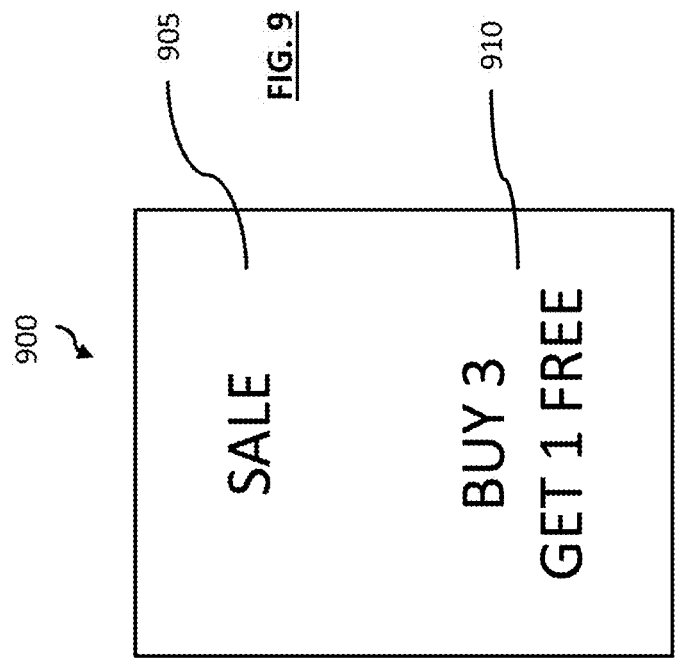
FIG. 9 illustrates a print receiving face of a single label from a first substrate in accordance with an illustrative embodiment.

FIG. 9 illustrates a print receiving face of a single label 900 from a first substrate in accordance with an illustrative embodiment. In alternative embodiments, fewer, additional, and/or different elements may be present. The single label 800 shows a side of a label similar to the single label 600 shown in FIG. 6. FIG. 9 shows the other side (the print receiving side) of a single label such as the single label 800 of FIG. 8 or the single label 600 shown in FIG. 6. A fixation portion 905 of the single label 900 may include characters or graphics on it from a printing or imaging process. For example, the fixation portion 905 may read "SALE." A non-fixation portion 910 of the single label 900 may also have characters, graphics, etc. from a printing or imaging process. The non-fixation portion 910 may flag away from an object when the fixation portion 905 is attached to the object. Accordingly, the text "BUY 3 GET 1 Free" on the non-fixation portion 910 may flag out from the object.

FIG. 10 illustrates an adhesive-receiving face of a first substrate 1000 with an adhesive pattern across the web in accordance with an illustrative embodiment. In alternative embodiments, fewer, additional, and/or different elements may be present. FIG. 11 illustrates a print receiving face of a second substrate 1100 with an adhesive pattern across the web in accordance with an illustrative embodiment. In alternative embodiments, fewer, additional, and/or different elements may be present. The first substrate 1000 and the second substrate 1100 show adhesive-coated areas (e.g., 1005, 1110) and release areas (e.g., 1010, 1105). The substrates 1000 and 1100 are similar to the substrates 100 and 200 shown in FIGS. 1 and 2, except that the adhesive-coated regions and release regions are placed and configured differently.

On the substrates 1000 and 1100, the adhesive-coated regions and the release regions extend continuously from a top edge to a bottom edge of the substrates 1000 and 1100. The adhesive-coated regions and release regions also alternate on the substrates 1000 and 1100 between the leading edge and the trailing edge of each substrate. In FIGS. 10 and 11, the adhesive-coated regions and release regions are configured so that an adhesive edge never corresponds with the leading edge of a substrate, as demonstrated by the space 1115 between the adhesive-coated region 1005 and the leading edge of the substrate 1000. However, in an alternative embodiment, an adhesive-coated region may coincide with a leading edge of a substrate.

Further, line 1120 indicates that edges of adhesive-coated areas on the substrates 1000 and 1100 may line up. In other alternative embodiments, adhesive-coated areas may overlap, or may not coincide or overlap at all (as shown by the space 1125. Accordingly, adhesive-coated areas and release areas may be configured in a variety of ways in various other embodiments. The substrates 1000 and 1100 may be adhered together to yield a dual-faced sheet, such as the dual-faced sheet 1200 shown in FIG. 12.

FIG. 12 illustrates a print receiving face of first and second substrates with adhesive patterns across the web adhered together and cut or perforated into labels in accordance with an illustrative embodiment. In alternative embodiments, fewer, additional, and/or different elements may be present. As discussed above, FIG. 12 displays a dual-faced sheet 1200 that includes two substrates, such as the substrates 1000 and 1100 of the FIGS. 10 and 11.

The dual-faced sheet 1200 in FIG. 12 further shows how label sections may be cut or perforated in the dual-faced sheet 1200. Label section 1210 shows a cut or perforated label section where there is no gap between the adhesive-coated areas of a first and second substrate. Further, on the label section 1210, there is no gap between the edges of the label section 1210 cut or perforation and the beginning of an adhesive-coated area on either the first or second substrate. In another example of how label sections may be configured, a label section 1205 shows that label sections may also be spaced out between each other when cutting or perforating the label sections. Such a label configuration may make it easier to remove a single label from a dual-faced sheet. In other embodiments, label sections may be diecut or perforated in various configurations.

FIGS. 13-18 demonstrate how dual-faced labels may be formed with a release agent or formulation. FIG. 13 illustrates an adhesive-receiving face of a first substrate 1300 with a release formulation applied in accordance with an illustrative embodiment. In alternative embodiments, fewer, additional, and/or different elements may be present. FIG. 14 illustrates a print receiving face of a second substrate 1400 with a release formulation on an opposite (not visible) side of the second substrate applied in accordance with an illustrative embodiment. The area of the release formulation is shown in dashed lines as it is on the opposite side (adhesive-receiving face) of the substrate. In alternative embodiments, fewer, additional, and/or different elements may be present.

The first substrate 1300 and the second substrate 1400 show regions with no release formulation (e.g., 1305, 1315, 1410, 1420). The first substrate 1300 and the second substrate 1400 also show release formulation regions (e.g., 1310, 1320, 1405, 1415). In this embodiment, one edge of each of the release formulation regions is interleaved with or overlapped with a corresponding release formulation region on the other substrate. For example, the release formulation region 1310 of the first substrate 1300 overlaps or interleaves with the release formulation region 1415 of the second substrate 1400. The overlapping is shown by the dimension 1425. Also in this embodiment, each of the release formulation regions has an edge that aligns with an edge of another corresponding formulation region on a different substrate. For example, a line 1430 shows that an edge of each of the release formulation regions 1320 and 1415 generally correspond.

In an alternative embodiment, both edges of every release formulation region would overlap with a corresponding release formulation region on another substrate. In another embodiment, all edges of release formulation regions would generally correspond across different substrates. In another embodiment, release formulation regions may not overlap or have edges that line up. In yet another embodiment, release formulation regions may include any combination of overlapping/interleaving, edges lining up, and no correspondence at all between release formulation regions of different substrates.

FIG. 15 illustrates an adhesive-receiving face of a first substrate 1500 with adhesive applied in accordance with an illustrative embodiment. In alternative embodiments, fewer, additional, and/or different elements may be present. FIG. 16 illustrates a print receiving face of a second substrate 1600 with a release formulation applied in accordance with an illustrative embodiment. In alternative embodiments, fewer, additional, and/or different elements may be present.

The first substrate 1500 and the second substrate 1600 may correspond to the first substrate 1300 and the second substrate 1400, respectively. Adhesive is added to the first substrate 1500. For example, adhesive-coated regions 1505 and 1510 are shown on the substrate 1500. The adhesive covers both a portion of the release formulation and a portion of the substrate 1500 that does not have the release formulation. In this embodiment, the adhesive-coated regions, such as the region 1510, leave spaces between the adhesive-coated region and certain release formulation regions. For example, regarding the adhesive-coated region 1510, there is a space to the left of the adhesive-coated region and the release region, as shown by dimension 1515. In an alternative embodiment, the adhesive in the adhesive-coated region 1510 could extend further into or past the dimension 1515. If adhesive was in the dimension 1515, the adhesive would stay adhered to the first substrate 1500. The dimension 1515 could also be larger, lowering the size of the adhesive-coated region 1510. Further in this embodiment, the right edge of the adhesive-coated area 1510 and the left edge of the release region 1610 make a gap of a dimension 1615. The adhesive-coated region 1510 may be larger or smaller to increase or decrease the dimension 1615. The adhesive-coated region 1510 may even extend beyond the left edge of the release region 1610.

In an alternative embodiment the release regions on each respective substrate would not overlap or interleave. In such an embodiment, adhesive could be applied to all of the first substrate 1500. Accordingly, adhesive could then be adhered to portions with no release formulation on the substrates 1500 and 1600.

FIG. 17 illustrates an adhesive-receiving face of a first substrate 1700 after being separated from a second substrate 1800 in accordance with an illustrative embodiment. In alternative embodiments, fewer, additional, and/or different elements may be present. FIG. 18 illustrates a print receiving face of a second substrate 1800 after being separated from a first substrate 1700 in accordance with an illustrative embodiment. In alternative embodiments, fewer, additional, and/or different elements may be present.

Accordingly, FIGS. 17 and 18 show a configuration of the substrates shown in FIGS. 15 and 16 after the substrates have been laminated together and subsequently separated. The substrate 1700 shows adhesive-coated regions (e.g., 1705, 1720) where there was no release formulation or agent, so the adhesive stayed on the substrate 1700. Additionally, the adhesive stayed on the substrate 1700 because the corresponding part of the substrate 1800 had a release region 1805 (and also 1820). Similarly, the substrate 1800 shows adhesive-coated regions (e.g., 1810, 1825) where there was no release formulation or agent on the substrate 1800, but there was a release region 1710 on the first substrate 1700. The first substrate 1700 shows another similar release region 1725 and a gap 1715, where there was no release agent or formulation and there was also no adhesive applied. The configurations of the adhesive-coated regions, release regions, and other areas may be varied in different embodiments. For example, the methods described with regard to FIGS. 13-18 may be utilized to make any configuration of a dual-faced label sheet as disclosed herein, including any of the configurations or alternatives shown in or discussed with respect to FIGS. 1-12. For example, the alternating patterns of adhesive and release formulation/agent that cause the adhesive to split staying with a non-release side when it is coated on one substrate and laminated together.

In an alternative embodiment, other methods of applying release formulations/agents and adhesive may be used. For example, instead of applying adhesive to only one substrate as demonstrated in FIGS. 15 and 16, adhesive may be applied to both substrates in any of the patterns or configurations disclosed herein prior to the two substrates being laminated together.

Figure 19:
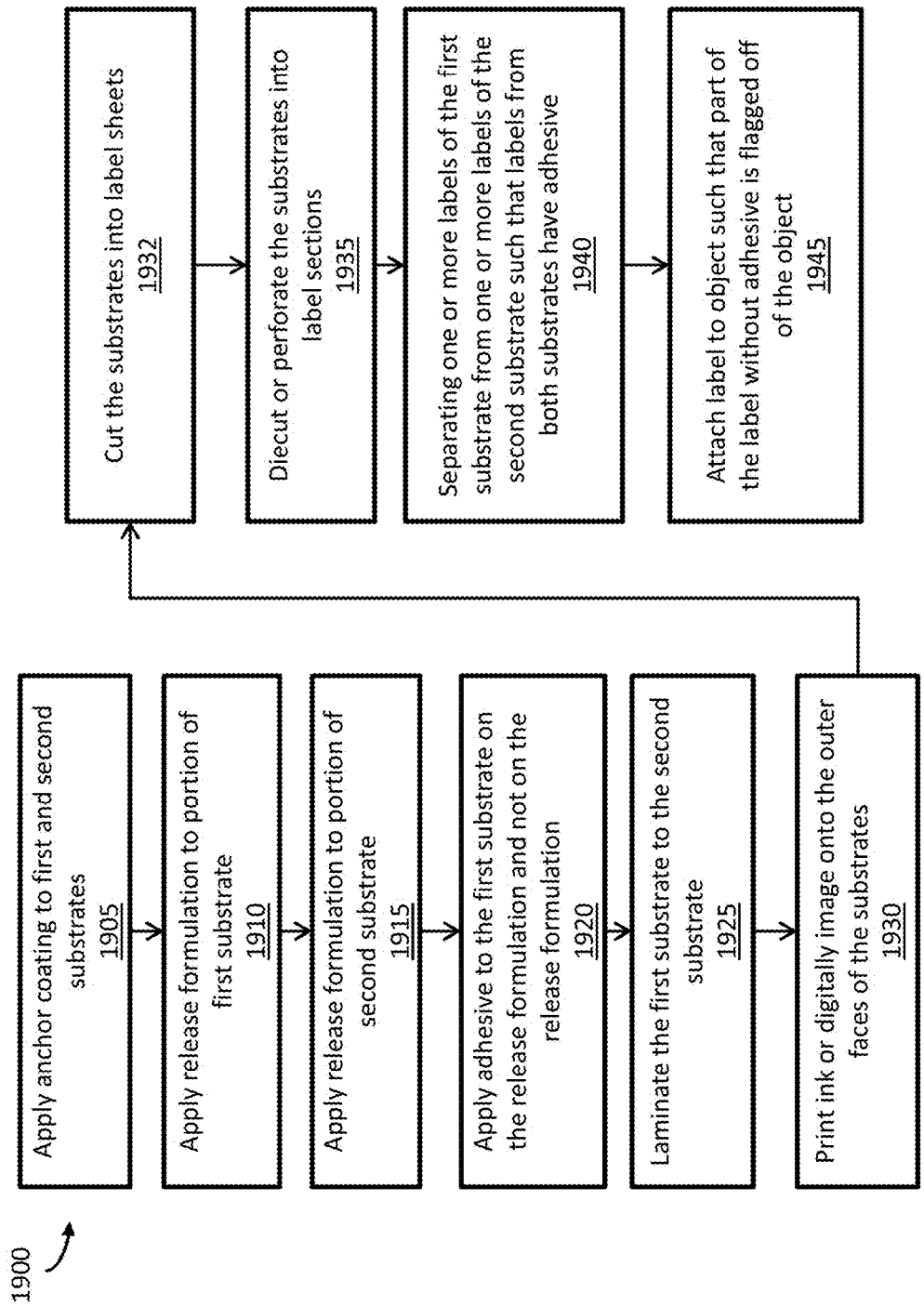
FIG. 19 illustrates an example of a method for applying adhesive to two substrates for dual sided labels in accordance with an illustrative embodiment.

FIG. 19 illustrates an example of a method 1900 for applying adhesive to two substrates for dual sided labels in accordance with an illustrative embodiment. In alternative embodiments, fewer, additional, and/or different operations may be performed. Also, the use of a flow diagram is not meant to be limiting with respect to the order of operations performed. In an operation 1905, an anchor coating is applied to a first substrate and a second substrate.

In an operation 1910, a release formulation is applied to a portion of the first substrate, for example, as shown in FIG. 13. For example, the release formulation may be applied to the first substrate such that the release formulation is in a pattern. In other words, a pattern release coating is applied to the first substrate. In an operation 1915, a release formulation is applied to a portion of the second substrate, for example, as shown in FIG. 14. For example, the release formulation may be applied to the second substrate such that the release formulation is in a pattern. In other words, a pattern release coating is applied to the second substrate. In an operation 1920, adhesive is applied to the first substrate both on the release formulation already on the first substrate and not on the release formulation. That is, the adhesive is applied to parts of the first substrate with and without the release formulation. For example, the adhesive may be applied to the first substrate such that the adhesive is in a pattern. In other words, a pattern coating adhesive is applied to the first substrate.

In an operation 1925, the first substrate and the second substrate are laminated together. In an operation 1930, ink printing or digital imaging is applied to the outer print receiving faces of the substrates. In various embodiments, printing ink may be applied to the substrates, rolls, or sheets via flexography, letterpress, screen, or offset print technologies. Digital imaging of substrates, rolls, or full size sheets may be accomplished on toner based technologies including HP™, IGen™, or Xeikon™ presses as well as desk top laser printers using cut sheet sheets, inkjet technology including Jetrion™ and Domino™ printers, HP Indigo™, and Memjet™ print heads including Colordyne™. Preprinted information may be used and this could be printed flexographic. In an operation 1932, the substrates are cut into label sheets. That is the substrates are sheeted to include groups of labels. This may make groups of labels easy to handle, transport, package, etc. Different numbers of total labels may be included on a sheet in varying embodiments. In an operation 1935, the dual sided label sheet (the laminated first and second substrate) is diecut or perforated into label sections. In one embodiment, sheeting of the labels may occur before the individual label sections (each label section has two labels front and back: the dual sides) are cut or perforated. In an alternative embodiment, the individual label sections are cut or perforated after sheeting of the labels occurs. In an operation 1940, one or more labels of the first substrate are separated from one or more labels of the second substrate such that labels from each substrate have adhesive on the adhesive-receiving face. In an operation 1945, a label is attached to an object such that part of the label without adhesive is flagged off of the object.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    applying a release formulation to a first substrate, wherein the release formulation is applied to a first portion of the first substrate leaving a second portion of the first substrate without the release formulation;
    applying the release formulation to a second substrate, wherein the release formulation is applied to a second portion of the second substrate leaving a first portion of the second substrate without the release formulation;
    applying an adhesive to the first substrate, wherein the adhesive covers at least a part of the first portion of the first substrate and at least a part of the second portion of the first substrate; and
    laminating the first substrate to the second substrate to form a laminated article;
    wherein the laminated article is configured to transfer the adhesive on the first portion of the first substrate to the first portion of the second substrate upon separation of the first substrate from the second substrate.

2. The method of claim 1, wherein the laminated article is further configured such that the adhesive on the second portion of the first substrate remains adhered to the first substrate upon separation of the first substrate from the second substrate.

3. The method of claim 1, wherein the first release region and the second release region comprise a non-silicone release formulation or a silicone release formulation.

4. The method of claim 1, wherein the first substrate comprises paper or a polymer film and the second substrate comprises paper or a polymer film.

5. The method of claim 1, wherein the adhesive comprises a removable, repositionable, pressure sensitive, freezer grade, permanent, repulpable, or recyclable adhesive.

6. The method of claim 1, further comprising applying an anchor coating to all or part of the first and second substrates, wherein the adhesive is a removable adhesive and the anchor coating is in the form of a tie-coat or primer formulation.

7. The method of claim 6, wherein the anchor coating is configured to:
    enhance anchorage of the adhesive transferred to the first portion of the second substrate upon separation of the first substrate from the second substrate.

8. The method of claim 1, wherein the first and second substrates have an integral back-side anchor coating.

9. The method of claim 8, wherein the first and second substrates comprise paper facestocks with a clay coat, or film facestocks with a clay coating, chemical coating or corona backside treatment.

10. The method of claim 8, wherein the integral back-side anchor coating is configured to:
    enhance anchorage of the adhesive transferred to the first portion of the second substrate upon separation of the first substrate from the second substrate.

11. The method of claim 1, wherein the adhesive applied to the first substrate comprises a uniform or non-uniform, continuous or discontinuous, pattern of adhesive stripes in a machine direction or across a web.

12. The method of claim 1, wherein the adhesive is applied such that:
    the first substrate comprises a plurality of first adhesive-coated regions and a plurality of first release regions; and
    the second substrate comprises a plurality of second adhesive-coated regions and a plurality of second release regions.

13. The method of claim 12, wherein:
    the plurality of first adhesive-coated regions alternate with the plurality of first release regions;
    the plurality of second adhesive-coated regions alternate with the plurality of second release regions;
    the plurality of first adhesive-coated regions is configured to adhere the first substrate to the second substrate at the plurality of second release regions; and
    the plurality of second adhesive-coated regions is configured to attach the second substrate to the first substrate at the plurality of first release regions.

14. The method of claim 12, wherein the laminated article is configured to yield individual pairs by cutting, die cutting, perforating, scoring, sheeting, or guillotine cutting the laminated article, and further wherein the individual pairs are in the shape of a rectangle, polygon, or circle.

15. The method of claim 12, wherein the laminated article is configured to yield label sheets that include groups of labels by cutting, die cutting, perforating, scoring, sheeting, or guillotine cutting the laminated article.

16. The method of claim 12, further comprising performing same side cuts on at least one of the second portion of the first substrate and the first portion of the second substrate by cutting, die cutting, perforating, scoring, sheeting, or guillotine cutting the laminated article.

17. The method of claim 12, further comprising:
    printing ink or a digital image onto a first print receiving face opposite a first adhesive receiving face of the first substrate; and
    printing ink or a digital image onto a second print receiving face opposite a second adhesive receiving face of the second substrate.

18. The method of claim 12, further comprising:
    die cutting or perforating the first substrate and the second substrate to yield labels; and
    separating the first substrate from the second substrate;
    wherein each of the labels cut from the first substrate and the second substrate comprise a fixation portion with the adhesive and a non-fixation portion having no adhesive.

19. The method of claim 18, further comprising attaching the fixation portion of a label to an object with the adhesive, wherein the non-fixation portion without adhesive extends from the object as a flag.

\* \* \* \* \*